United States Patent [19]
Sato et al.

[11] Patent Number: 5,625,740
[45] Date of Patent: Apr. 29, 1997

[54] RECORDING AND REPRODUCING SYSTEM IN WHICH AUDIO AND VIDEO SIGNALS ARE RECORDED IN A PLURALITY OF SETS

[75] Inventors: Yoshiaki Sato; Nobuya Sakai, both of Tokyo, Japan

[73] Assignee: Asahi Kogaku Kogyo Kabushiki Kaisha, Tokyo, Japan

[21] Appl. No.: 231,910

[22] Filed: Apr. 25, 1994

Related U.S. Application Data

[63] Continuation of Ser. No. 11,821, Jan. 29, 1993, abandoned, which is a continuation of Ser. No. 658,472, Feb. 20, 1991, abandoned.

[30] Foreign Application Priority Data

Feb. 22, 1990 [JP] Japan ........................... 2-42188

[51] Int. Cl.⁶ .................................................. H04N 5/781
[52] U.S. Cl. ......................................... 386/106; 386/96
[58] Field of Search ................................. 358/342, 341, 358/343; 360/19.1; 386/106, 75, 96, 104, 46

[56] References Cited

U.S. PATENT DOCUMENTS

| | | | |
|---|---|---|---|
| 4,587,635 | 5/1986 | Hashimoto et al. | 358/342 |
| 4,777,537 | 10/1988 | Ueno et al. | 358/341 |
| 4,905,094 | 2/1990 | Pocock et al. | 358/342 |
| 4,947,265 | 8/1990 | Hayashi et al. | 358/341 |
| 5,122,886 | 6/1992 | Tanaka | 358/335 |
| 5,124,814 | 6/1992 | Takahashi et al. | 358/343 |
| 5,166,804 | 11/1992 | Takahashi | 358/341 |

FOREIGN PATENT DOCUMENTS

| | | |
|---|---|---|
| 0180477A3 | 5/1986 | European Pat. Off. . |
| 0223423A | 5/1987 | European Pat. Off. . |
| 0245904A1 | 11/1987 | European Pat. Off. . |
| 2-50358 | 2/1990 | Japan . |

OTHER PUBLICATIONS

Engineering Department, Electronic Industries Association of Japan, "Specification of Still Video Floppy Disc Systems," Sep. 1987.

Primary Examiner—Thai Tran
Assistant Examiner—Huy Nguyen
Attorney, Agent, or Firm—Sughrue, Mion, Zinn, Macpeak & Seas

[57] ABSTRACT

In a recording and reproducing system operable in an AV mode for recording and reproducing a plurality sets of video and audio signals, each set consisting of a combination of at least a video signal and an audio signal, an AV number is recorded together with the video and/or audio signals in each set, and all video and audio signals having the same AV number can be reproduced in combination.

18 Claims, 11 Drawing Sheets

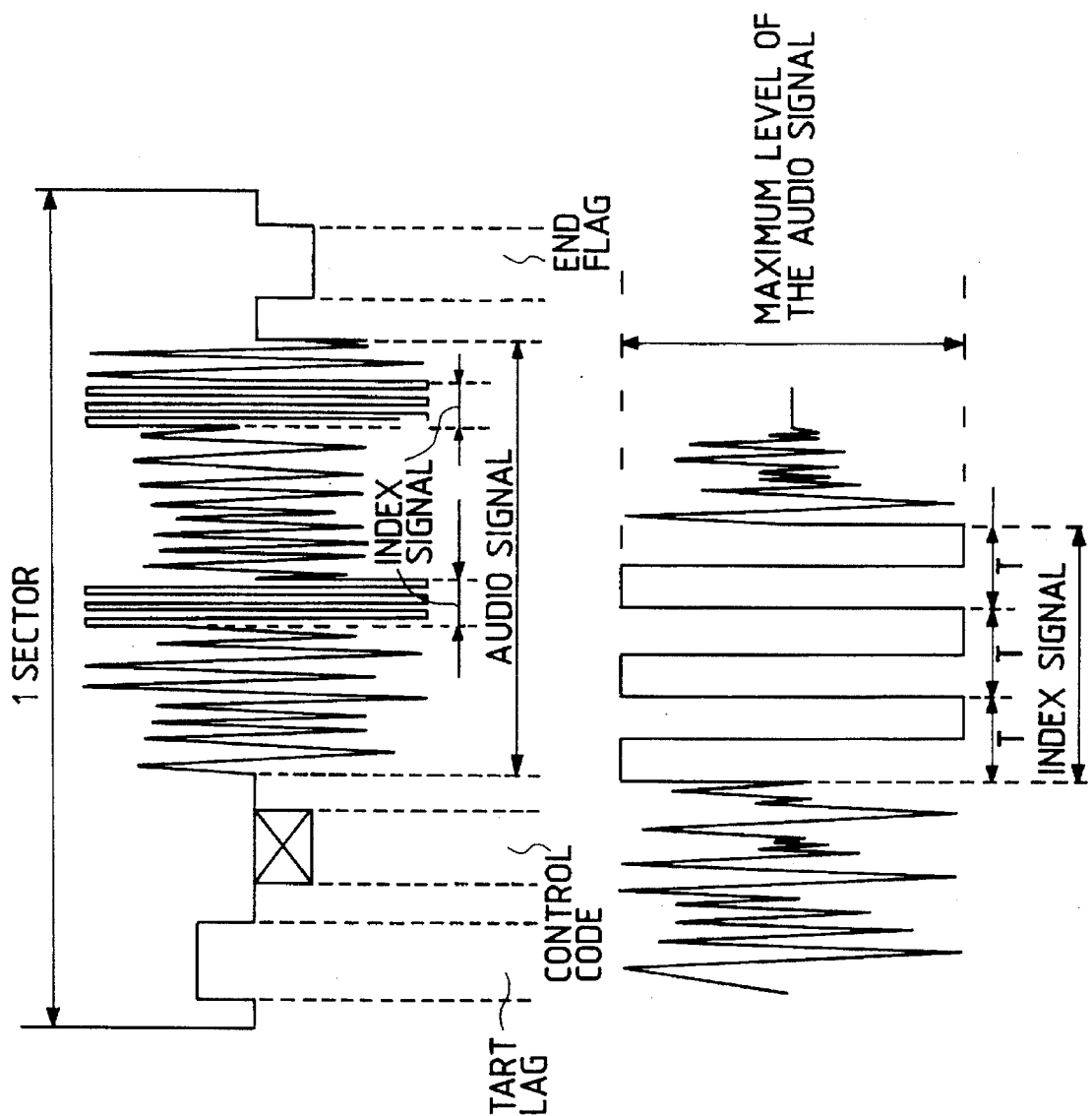

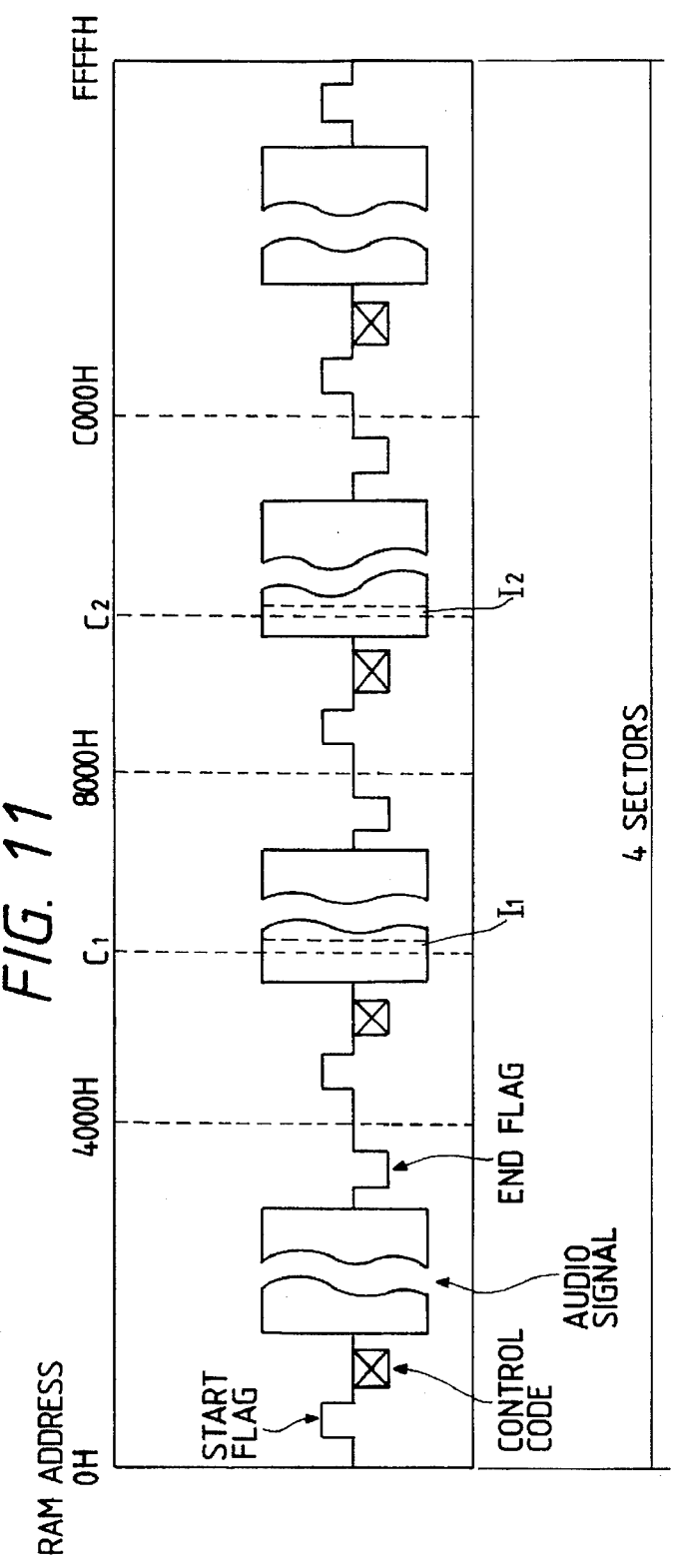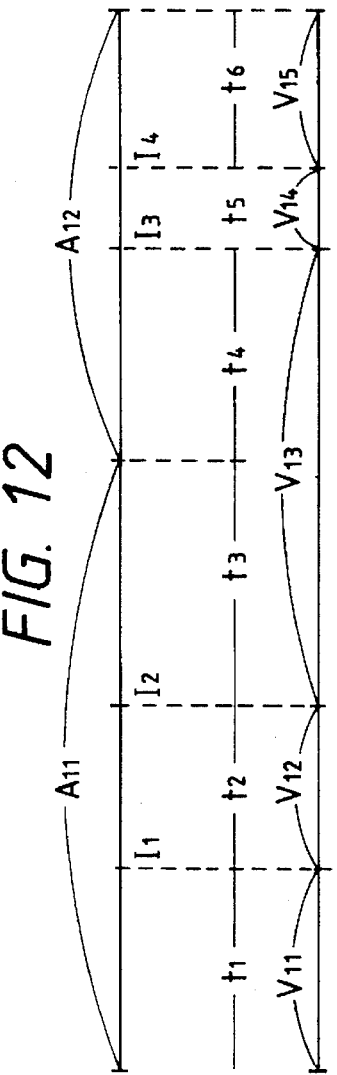

5,625,740

RECORDING AND REPRODUCING SYSTEM IN WHICH AUDIO AND VIDEO SIGNALS ARE RECORDED IN A PLURALITY OF SETS

This is a continuation of application Ser. No. 08/011,821 filed Jan. 29, 1993 abandoned, which is a continuation of application Ser. No. 07/658,472 filed Feb. 20, 1991, now abandoned.

BACKGROUND OF THE INVENTION

This invention relates to a recording and reproducing system whose typical example is an electronic still camera, in which video signals and audio signals are recorded, in combination, on coaxial tracks on a magnetic disk. The present disclosure relates to the subject matter contained in Japanese patent application No. Hei. 2-42188 (filed on Feb. 22, 1990) which is expressly incorporated herein by reference in its entirety.

An electronic still camera is designed to record a video signal and an audio signal on a magnetic disk, with the video signal and the audio signal being recorded independently of each other in a normal mode and being recorded in combination in an AV mode. Therefore, the video signal and audio signal recorded in the normal mode are reproduced separately, and the video signal recorded in the AV mode is reproduced simultaneously when the corresponding audio signal is reproduced.

However, in the conventional electronic still camera, in the case where a single video track and a plurality of audio tracks corresponding to the video track are recorded in the AV mode, when it is required to reproduce the video and audio tracks by specifying one of these tracks, it is very difficult to determine which track number should be specified. Especially, in the case where a plurality of sets or pairs of video and audio tracks are recorded on the disk in the AV mode, the fear of confusing the operator will increase. Further, an audio signal and plural video signals cannot be recorded and reproduced in combination. Furthermore, plural audio signals and plural video signals cannot be recorded and reproduced in combination.

SUMMARY OF THE INVENTION

In view of the foregoing, an object of this invention is to provide a recording and reproducing system in which audio signals and/or video signals recorded on the disk are reproduced in a correct sequence.

A recording and reproducing system according to the invention is operable in an AV mode in which audio and video signals are recorded in a plurality of sets, each set comprising a combination of at least an audio signal and a video signal, the system comprising: recording means for recording audio and video signals on a recording medium; means for setting a discriminating information for each of the plurality of sets; recording control means for controlling the recording means to record the discriminating information together with at least one of an audio signal and a video signal in a set of the plurality of sets; reproducing means for reproducing the audio and video signals including the discriminating information from the recording medium; detecting means for detecting the discriminating information from signals reproduced from the recording medium; reproducing control means for controlling the reproducing means to reproduce in combination the audio and video signals in the set for the discriminating information.

A disk recording device according to the invention includes recording means for recording audio and video signals on respective audio and video tracks of a disk, the device being operable in an AV mode in which audio and video signals are recorded in a plurality of sets with each set comprising a combination of at least an audio signal and a video signal, the device comprising: means for setting a discriminating information for each of the plurality of sets; memory means for storing the discriminating information; and control means for controlling the recording means to record the discriminating information together with at least one of an audio signal and a video signal in a set of the plurality of sets.

A disk reproducing device according to the invention includes reproducing means for reproducing audio and video signals from a disk on which the audio and video signals have been recorded on respective audio and video tracks, the disk having recorded thereon at least one set comprising a combination of audio and video signals, with at least one of the audio and video signals in the set being recorded together with an discriminating information indicating the set, the reproducing device being operable in an AV mode in which the set of signals are reproduced together, the device comprises: detecting means for detecting the discriminating information from signals reproduced from the disk; and control means for controlling the reproducing means to reproduce in combination the audio and video signals in the set.

BRIEF DESCRIPTION OF THE DRAWINGS

The invention will be more clearly understood from the following description in conjunction with the accompanying drawings, wherein:

FIGS. 7 and 8 are waveform diagrams for a description of the operation of the device shown in FIG. 2;

FIG. 11 is a diagram showing an example of the signal arrangement in an audio memory in the recording and reproducing system according to the invention;

FIG. 12 is a timing chart for a description of the signal reproducing operation of the recording and reproducing system according to the invention;

DETAILED DESCRIPTION OF THE PREFERRED EMBODIMENT

Figure 1:
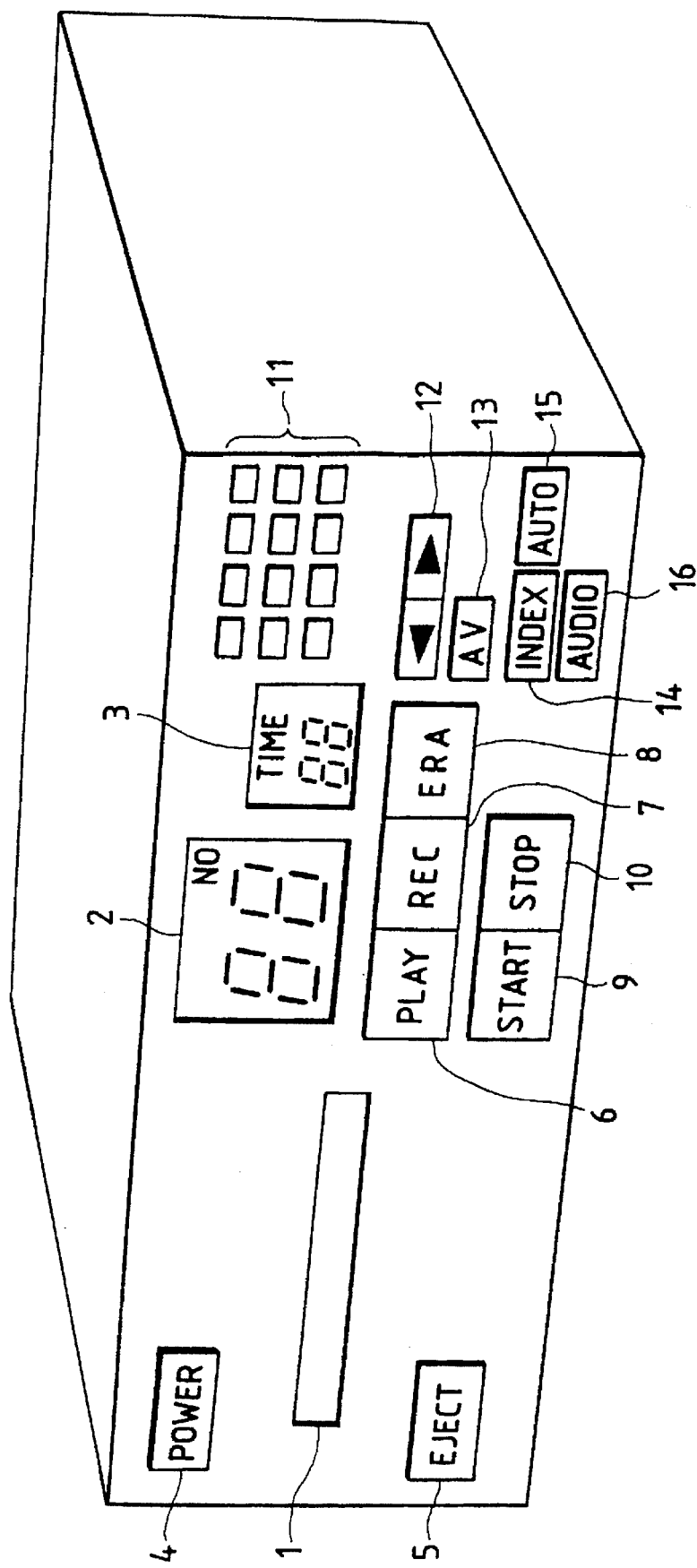
FIG. 1 is a perspective view showing the external appearance of a recording and reproducing system according to the invention.

FIG. 1 is a perspective view showing the external appearance of one example of one application of a recording and reproducing system according to this invention.

The front panel of the device includes an inserting opening 1 through which a magnetic disk is loaded in the device, display sections 2 and 3 for displaying a track number (AV number) and time, and various switches. A power switch 4 is operated to turn on or off the power source, and an eject switch 5 is operated to eject the magnetic disk from the device. A play switch (PLAY) 6, a record switch (REC) 7, and an erase switch (ERA) 8 are operated to set a reproducing (playback) mode, a recording mode, and an erasing mode, respectively. A start switch (START) 9 and a stop switch (STOP) 10 are operated to start and stop the operation in each of the above-described operating modes.

A ten-key pad 11 is operated to input numerical data. A moving switch 12 is operated to make access to the track which is located radially inwardly or outwardly next to the current (present) track. An AV mode switch 13 is operated to set an AV mode. Here, the AV mode is defined as a mode in which audio and video signals are recorded and reproduced in combination. An index switch (INDEX) 14 is operated to record index signals successively. The index switch 14 is for making instructions for switching the video signal in the reproducing mode, which will be described later. An auto switch (AUTO) 15 is operated to automatically make access to tracks one after another. A sound receiving switch (AUDIO) 16 is operated to start to receive audio signals or to stop the reception of the audio signals. The stop switch 10 may be operated to stop the reception of the audio signals.

Figure 2:
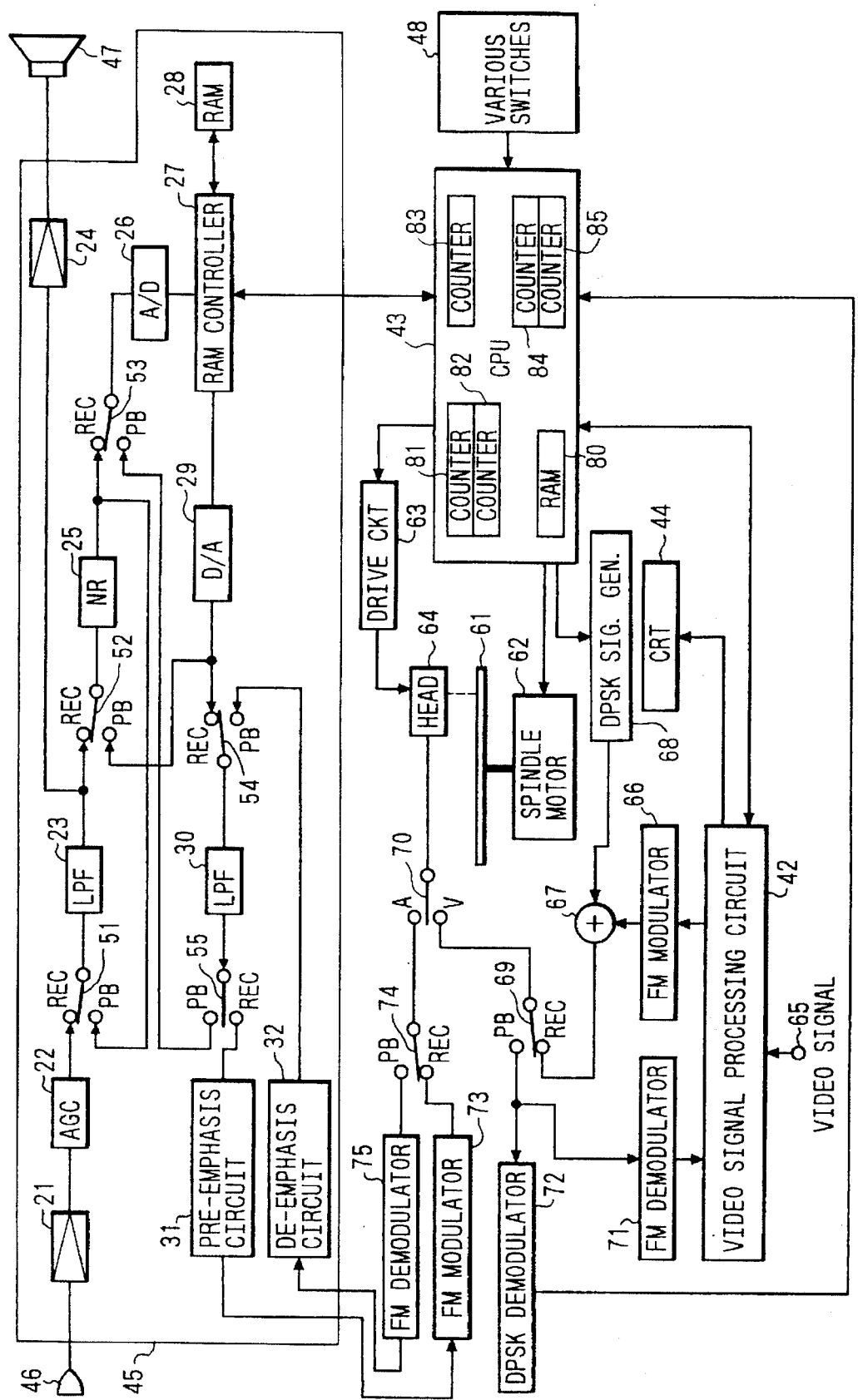
FIG. 2 is a block diagram showing the electrical arrangement of the recording and reproducing system according to the invention.

FIG. 2 is a block diagram showing the electrical arrangement of one example of the recording and reproducing system of the invention.

In the recording and reproducing system, as shown in FIG. 2, a disk 61 is rotated by a spindle motor 62, which is controlled by a CPU (central processing unit) 43 comprising a microcomputer. A drive circuit 63 connected to the CPU 43 positions a magnetic head 64 at a desired track. The CPU 43 receives signals which are provided when various switches 48 provided on the front panel of the device (shown in FIG. 1) are operated.

A video signal is input through an external input terminal 65, to which an image pickup circuit including an image pickup element such as a CCD (charge coupled device) is connected. The video signal is applied to a video signal processing circuit 42 where it is processed as normally required. The output of the video signal processing circuit 42 is applied to an FM modulator 66, where it is FM-modulated. The output of the FM modulator 66 is supplied to an adder 67. The adder 67 adds the output of the FM modulator 66 to the DPSK (differential phase shift keying) signal corresponding to the ID codes output by a DPSK signal generator 68. The result of the addition is applied through switches 69 and 70 to the magnetic head 64.

An output video signal from the magnetic head 64 is applied through the switch 70 and a switch 69 to an FM demodulator 71 and a DPSK demodulator 72. The FM demodulator 71 and the DPSK demodulator 72 separate, extract and demodulate the respective signals. The demodulated video signal is then applied to the video signal processing circuit 42. The video signal processing circuit 42 processes the demodulated video signal and outputs it to a CRT 44. The demodulated signal from the DPSK demodulator 72 is applied to the CPU 43. The CPU 43 reads the demodulated signal as the ID codes.

In an audio signal processing circuit 45, a recording audio signal input through a microphone 46 is supplied to a RAM (random access memory) 28 through an amplifier 21, an automatic gain control (AGC) circuit 22, a switch 51, a low-pass filter (LPF) 23, a switch 52, a noise reduction (NR) circuit 25, a switch 53, an A/D (analog-to-digital) converter 26, and a RAM controller 27. The recording audio signal read out of the RAM 28 as an audio memory is applied through the RAM controller 27, a D/A converter 29, a switch 54, a low-pass filter 30, a switch 55, a pre-emphasis circuit 31, an FM modulator 73, a switch 74 and the switch 70 to the head 64, so that it is recorded on the disk 61. The reproducing audio signal output from the head 64 is applied through the switches 70 and 74, an FM demodulator 75, a de-emphasis circuit 32, the switch 54, the low-pass filter 30, the switch 55, the switch 53, the A/D converter 26, and the RAM controller 27 to the RAM 28, where it is stored. The reproducing audio signal read out of the RAM 28 is applied to the loudspeaker 47 through the RAM controller 27, the D/A converter 29, the switch 52, the noise reduction circuit 25, the switch 51, the low-pass filter 23, and the amplifier 24.

Further, in FIG. 2, the CPU 43, in response to outputs from various switches 48 (corresponding to the switches 6 through 16 in FIG. 1), the video signal processing circuit 42 and the audio signal processing circuit 45, controls the audio signal and video signal recording and reproducing operations. Furthermore, the CPU 43 controls the RAM controller 27 to add and detect an index signal, a number of a lead video track and an AV number. Here, the AV number is defined as an information for reproducing together audio and video signals which have been recorded in combination. The CPU 43 includes a RAM (random access memory) 80, and counters 81 and 82. Further, the CPU 43 includes a counter 83 for an AV number, a counter 84 for a variable i, and a counter 85 for a variable j, which will be described later. In addition, the CPU 43 controls the switches 51 through 55 and the switches 69 and 74 in such a manner that the armature of each of these switches is tripped over to the contact REC when a signal recording mode is set, and the armature of each of these switches is tripped over to the contact PB when a signal reproducing mode is set. Further, the CPU controls the switch 70 in such a manner that the armature of the switch is tripped over to the contact A when an audio signal is recorded or reproduced, and the armature of the switch is tripped over to the contact V when a video signal is recorded or reproduced.

Figure 3:
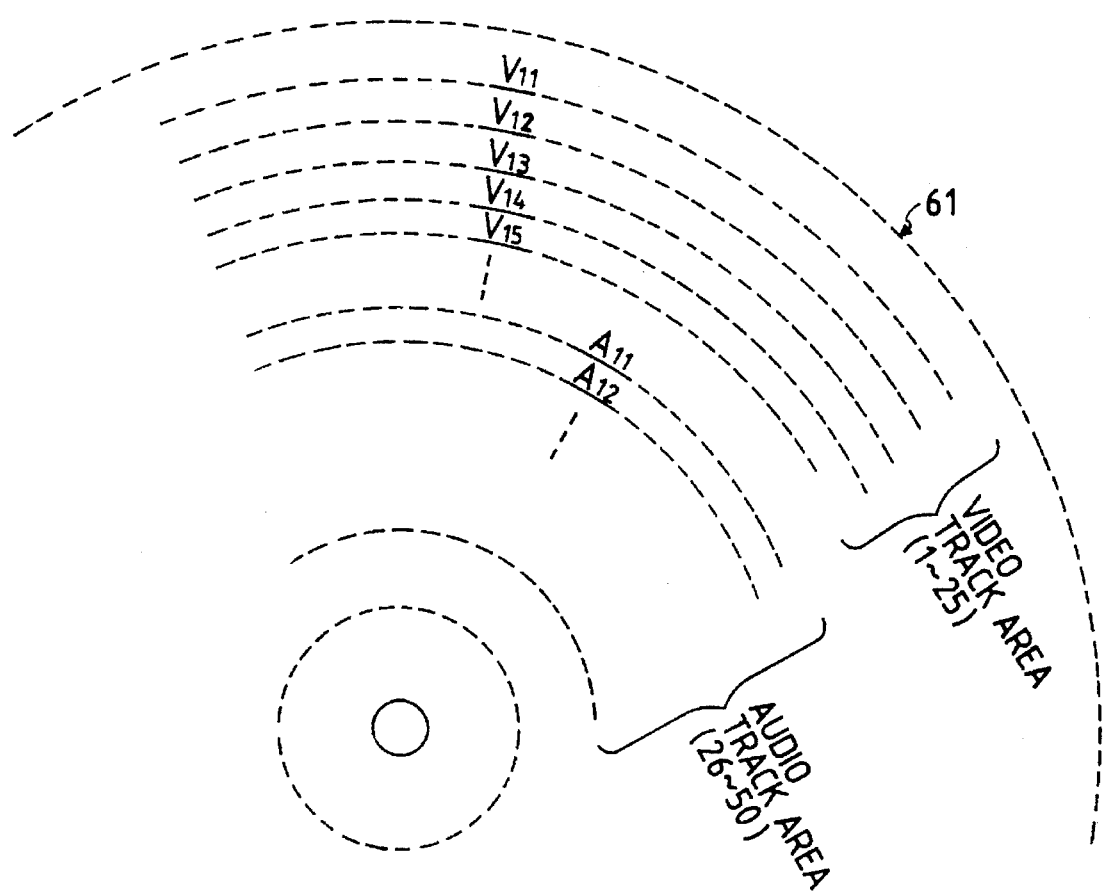
FIG. 3 is an explanatory diagram showing a recording format of video and audio signals on a disk in the recording and reproducing system according to the invention.

In this embodiment, the outer twenty-five tracks (1st through 25th tracks) on the disk 61 are used as video tracks, and inner twenty-five tracks (26th through 50th tracks) on the disk 61 are used as audio tracks, as shown in FIG. 3. The counter 81 is used for detecting the number of a lead vacant track in a video track area, and the counter 82 is used for detecting the number of a lead vacant track in an audio track area.

Figure 4:
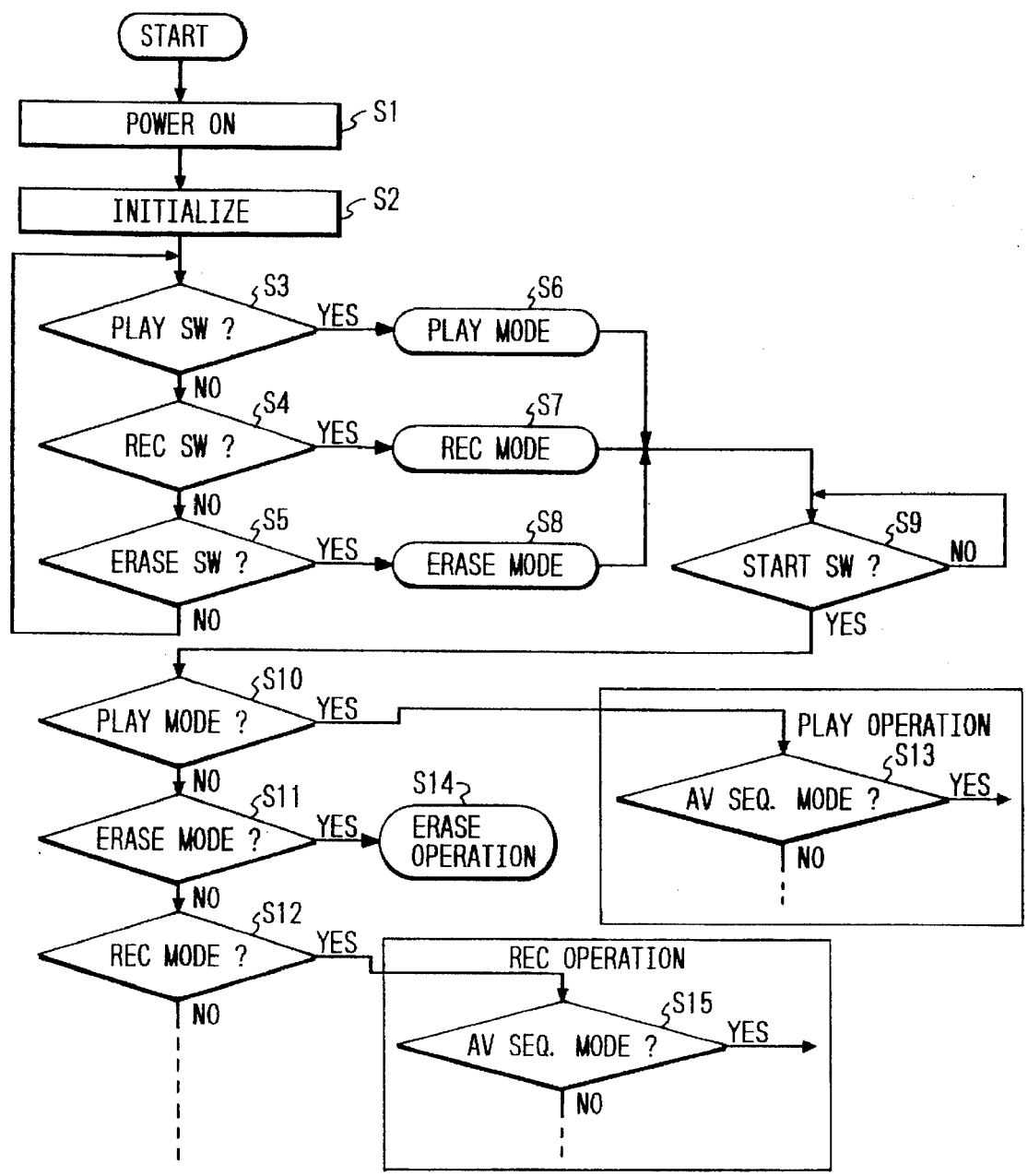
FIG. 4 is a flow chart for a description of the overall operation of the recording and reproducing system according to the invention.

The operation of the CPU will now be described with reference to a flow chart of FIG. 4 which illustrates the operation of the CPU in response to the operations of the various switches on the front panel of the device.

When the power switch 4 is turned on, the various circuits and means are electrically energized, and initialized as required (Steps S1 and S2). Next, it is determined whether or not the play switch 6, the record switch 7 or the erase switch 8 has been operated. In response to the operations of the play switch 6, the record switch 7 and the erase switch 8, the signal processing modes, namely, the signal reproducing mode, the signal recording mode, and the signal erasing mode are set, respectively (Steps S3 through S8).

Thereafter, it is determined whether or not the start switch 9 has been operated. When it is determined that the start switch 9 has been operated, then a signal reproducing (playback) operation, a signal recording operation or a signal erasing operation is started in correspondence to the selected one of the signal processing modes (Steps S9 through S15).

Figure 5:
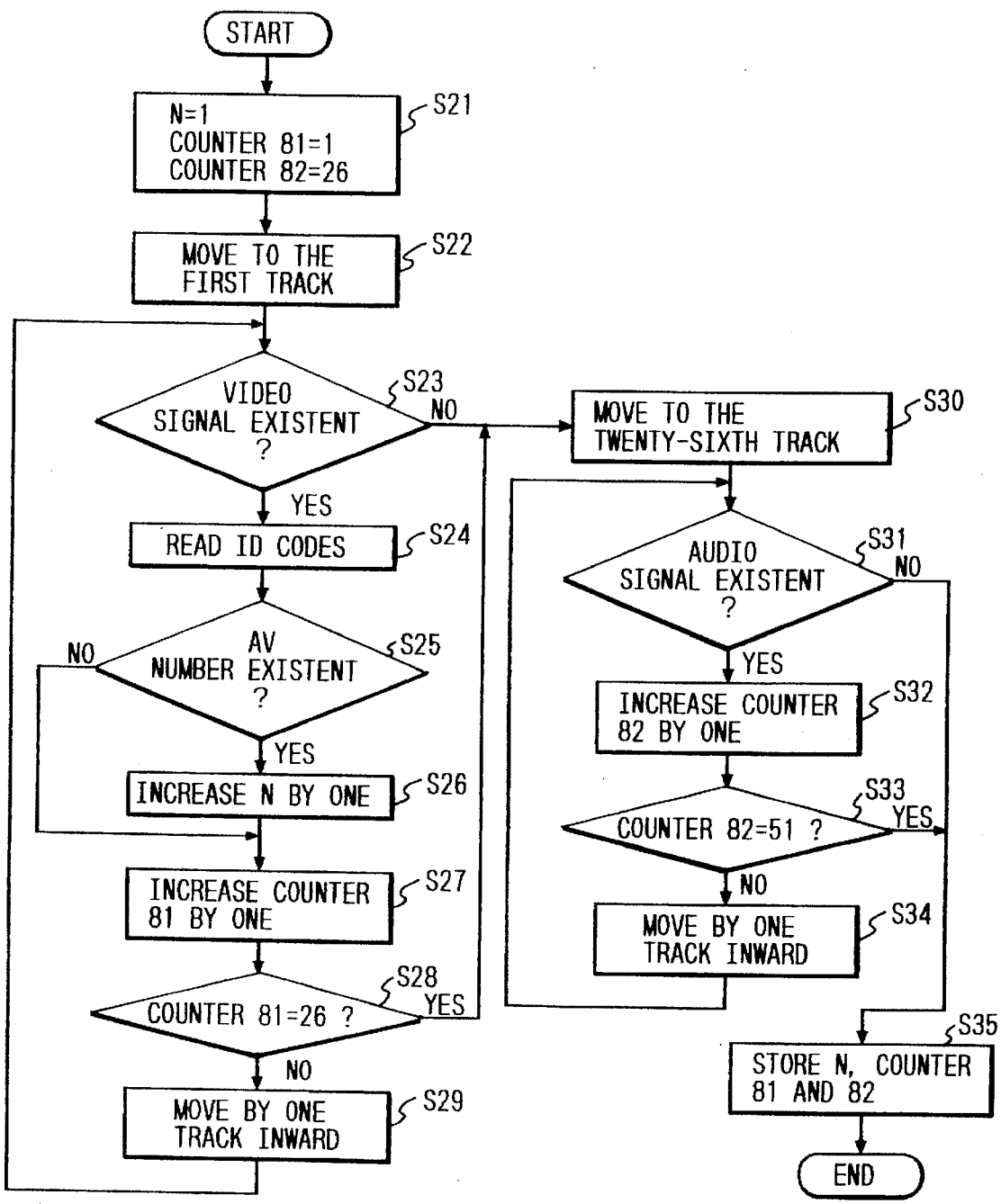
FIG. 5 is a flow chart for a description of the pre-search operation prior to the recording operation in the recording and reproducing system according to the invention.

When, in the signal recording mode, it is determined at Step S15 that the AV mode switch 13 has been operated to specify the AV mode, then the CPU 43 executes a pre-search operation prior to a recording operation as shown in a flow chart of FIG. 5.

Figure 6:
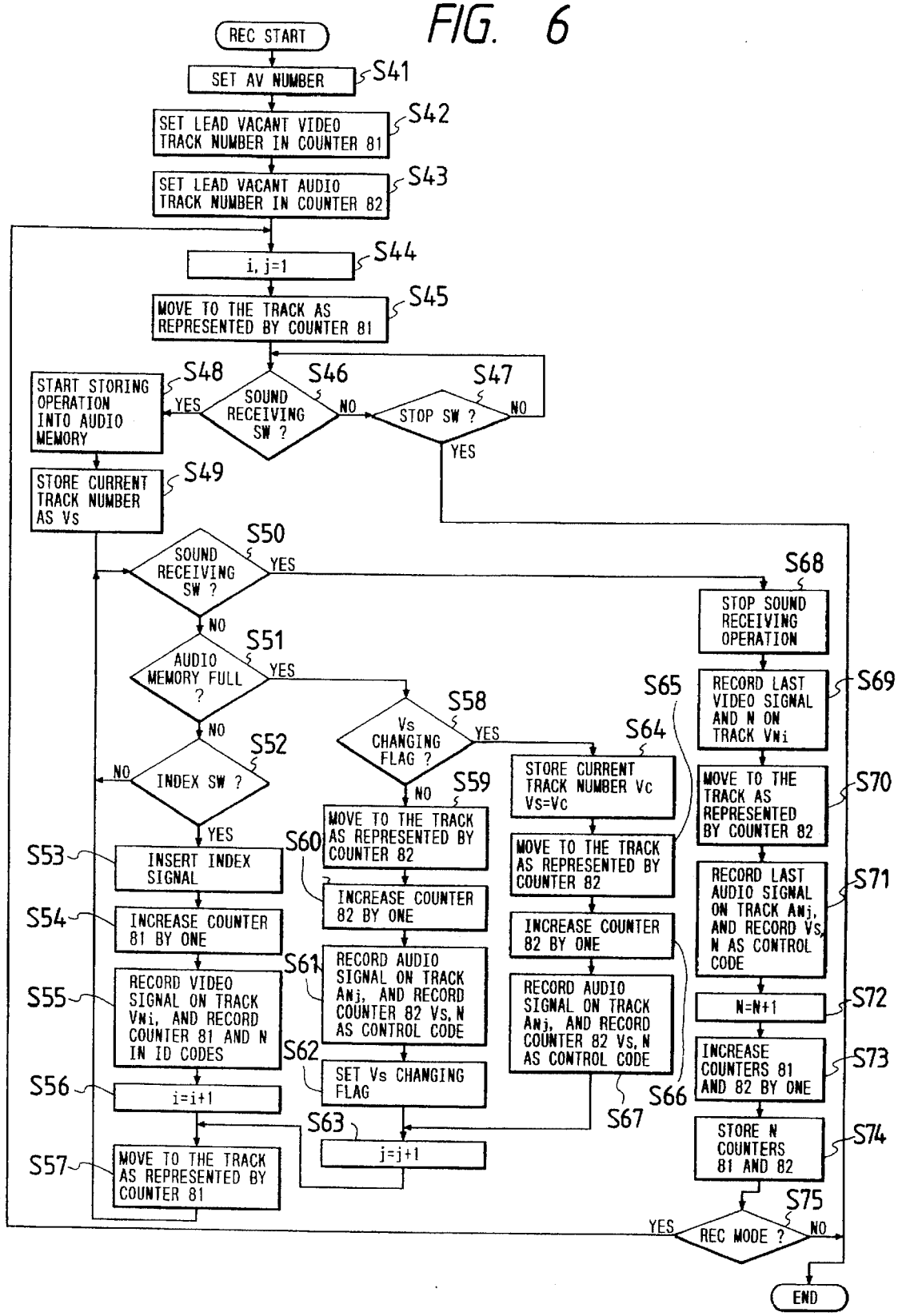
FIG. 6 is a flow chart for a description of the signal recording operation of the recording and reproducing system according to the invention.

First, an AV number N is set to one in the counter 83, and the counting values of the counters 81 and 82 are set to one and twenty-six respectively (Step S21). Here, the AV number N corresponds to the number of AV mode operations capable of being set for a disk. Next, the head 64 is moved to the first track, and the ID codes are read when a video signal is existent on the first track (Steps S22 through S24). Consequently, when an AV number is existent, the value of the number N is increased by one (Steps S25 and S26). Here, the data for the AV number can be recorded using the user's area in the ID codes, as described later. Thereafter, the counting value of the counter 81 is increased by one, and it is determined whether or not the counting value is equal to twenty-six (Steps S27 and S28). In Step S28, when the counting value of the counter 81 is not equal to twenty-six, the head 64 is moved by one track radially inward (step S29), and Step S23 is effected again. In Step S28, when the counting value of the counter 81 is equal to twenty-six, or when no video signal is existent in Step S23, the head 64 is moved to the twenty-sixth track and the counting value of the counter 82 is increased by one when an audio signal is existent on the twenty-sixth track (Steps S30 through S32). Thereafter, it is determined whether or not the counting value of the counter 82 is equal to fifty-one (Step S33). When the counting value is not equal to fifty-one in Step S33, the head 64 is moved by one track radially inward (Step S34), and Step S31 is effected again. When the counting value is equal to fifty-one in Step S33, or when no audio signal is existent in Step S31, the values of the number N, and the counters 81 and 82 are stored in the RAM 80 (Step S35). In such a manner, the AV number N for the next recording operation, the number of a lead vacant video track, and the number of a lead vacant audio track are detected. The recording operation is carried out after the above pre-search operation as shown in FIG. 6.

First, the AV number N which has been detected in the pre-search operation is set in the counter 83 (Step S41). Next, the number of the lead vacant video track which has been detected in the pre-search operation is set in the counter 81, and the number of the lead vacant audio track which has been detected in the pre-search operation is set in the counter 82 (Steps S42 and S43). Next, variables i and j are set to "1" in the counters 84 and 85 respectively, the head 64 is moved to the track as represented by counting value of the counter 81, and the CPU 43 waits until the sound receiving switch 16 is operated (Steps S44 through S46). If the stop switch 10 is operated before the sound receiving switch 16 is operated, then the recording operation is suspended (Step S47).

When the sound receiving switch 16 is operated, a sound receiving operation, that is, a storing operation into the audio memory (RAM 28) is started (Steps S46 and S48). Namely, the audio signal received through the microphone 46 is applied to the audio signal processing circuit 45. In the audio signal processing circuit 45, the input audio signal is amplified by the amplifier 21, adjusted to a predetermined level by the automatic gain control circuit 22, and applied to the low-pass filter 23, so that unnecessary high frequency components are removed from the audio signal. The output of the low-pass filter 23 is then applied through the switch 52 to the noise reduction circuit 25, so that it is compressed for noise reduction.

The output of the noise reduction circuit 25 is applied through the switch 53 to the A/D converter 26, where it is subjected to analog-to-digital conversion. The resultant digital signal is applied through the RAM controller 27 to the RAM 28, where it is stored. Further, the number V, of the track where the head 64 is currently positioned is stored in the RAM 80 in the CPU 43 (Step S49). The above sound receiving operation is carried out continuously until the sound receiving switch 16 is operated or the audio memory (RAM 28) becomes full (Steps S50 and S51). At the same time, a part of the audio signal being received which has passed through the low-pass filter 23 is supplied through the amplifier 24 to the loudspeaker 47 so as to be monitored.

When the index switch 14 is operated during the sound receiving operation, the CPU 43 applies a control signal to the RAM controller 27 to cause the latter 27 to output an index signal which is inserted in the audio signal, and stored in the RAM 28 (Steps S52 and S53). Next, the counting value of the counter 81 is increased by one (Step S54). Next, the video signal which is applied from the external input terminal 65 to the video signal processing circuit 42 is FM-modulated and recorded on the video track $V_{Ni}$ where the head 64 is currently positioned, and the counting value of the counter 81 corresponding to the next track number $V_F$ and the AV number are recorded on the video track $V_{Ni}$ using the user's area in the ID codes (Step S55). Here, the data for the counting value of the counter 81 and the AV number is output as a DPSK signal from the DPSK signal generator 68, added to the FM-modulated video signal, and applied to the head 64. Further, the video recording format applied to the present invention is proposed in "CPZ-250, SPECIFICATION OF STILL VIDEO FLOPPY DISC SYSTEMS" published by Engineering Department, Electronic Industries Association of Japan, in September 1987. In this embodiment, the counting value of the counter 81 corresponding to the next track number $V_F$ and the AV number are recorded on the video track $V_{Ni}$ using the user's area in the ID codes, as described above.

Thus, the FM-modulated video signal, for instance, of one field, and the DPSK signal containing data on the next track number and the AV number are recorded on one predetermined track.

Upon completion of recording the video signal, the variable i is increased by one in the counter 84, the head 64 is moved to the track as represented by the counting value of the counter 81, and Step S50 is effected again (Steps S56 and S57).

The above-described operations are repeatedly carried out, so that the video signals corresponding to the audio signal being received are recorded on the respective tracks whenever the index switch 14 is operated.

FIG. 7 is a waveform diagram showing the index signal and audio signal thus recorded (stored) in analog form. Here, the audio recording format applied to the present invention is proposed in "CPZ-250, SPECIFICATION OF STILL VIDEO FLOPPY DISC SYSTEMS" published by Engineering Department, Electronic Industries Association of Japan, in September 1987. In this embodiment, the counting value of the counter 82 corresponding to the next audio track number $A_F$, the number $V_s$ of the lead video track, and the AV number N are recorded as the control code (word W3 for $V_s$, and words W6–W8 for others) on the track $A_{Nj}$, as described later.

That is, the audio signal is assigned to sectors, each having a start flag set at the top, followed by a control code, which is followed by an audio signal. In addition, an end flag is set at the end of the sector. In the preferred embodiment, as shown in an enlarged diagram of FIG. 8, a signal which has a level corresponding to the maximum level of the audio signal and a predetermined period T is inserted in the audio signal as the index signal for three cycles so as to be recorded.

Returning to FIG. 6, when it is determined in Step 51 that the audio memory (RAM 28) is full during the sound receiving operation, it is determined whether or not a $V_s$ changing flag is existent (Step S58). In Step S58, when the $V_s$ changing flag is not existent, the head 64 is moved to the track as represented by the counting value of the counter 82, and the counting value is increased by one (Step S59 and S60). Next, the audio signal including the index signal stored in the RAM 28 is recorded on the track $A_{Nj}$ where the head 64 is currently positioned, and the counting value of the counter 82 corresponding to the next audio track number AF, the number $V_s$ of the lead video track, and the AV number N are recorded as the control code (word W3 for $V_s$, and words W6–W8 for others) on the track $A_{Nj}$ (Step S61).

That is, the CPU 43 applies a control signal to the RAM controller 27, to cause the controller 27 to produce the control code. The control code is superposed on the audio signal read out of the RAM 28. The superposed signal is applied to the D/A converter 29, where it is subjected to digital-to-analog conversion. The output of the D/A converter 29 is applied through the switch 54 to the low-pass filter 30, where unwanted high frequency components are removed from the input audio signal. The output of the low-pass filter 30 is applied through the switch 55 to the pre-emphasis circuit 31, where it is subjected to pre-emphasis. The output of the pre-emphasis circuit 31 is applied to the FM modulator 73. The FM-modulated signal from the FM modulator 73 is applied to the head 64 through the switches 74 and 70 so as to be recorded on the track $A_{Nj}$.

Upon completion of the recording operation of the audio signal on the first audio track $A_{Nj}$, the $V_s$ changing flag is set, the variable j is increased by one in the counter 85, and Step S57 is effected again (Steps S62 and S63).

In Step S58, when the $V_s$ changing flag is existent, the number $V_c$ of the track where the head 64 is currently positioned is stored, and the track number $V_s$ is changed to $V_c$ ($V_s=V_c$) (Step S64). Here, $V_c$ represents the lead video track number for the second audio track $A_{Nj+1}$. Next, the head 64 is moved to the track as represented by the counting value of the counter 82, and the counting value is increased by one (Steps S65 and S66). Next, the audio signal including the index signal stored in the RAM 28 is recorded on the track $A_{Nj}$ where the head 64 is currently positioned, and the counting value of the counter 82 corresponding to the next audio track number $A_F$, the number $V_s$ of the lead video track, and the AV number N are recorded as the control code (word W3 for $V_s$, and words W6–W8 for others) on the track $A_{Nj}$ (Step S67). Consequently, Step S63 is executed.

The above-described operations are repeatedly carried out, so that under the AV number preset, a plurality of video tracks (or one video track) and a plurality of audio tracks (or one audio track) are formed in combination as sets.

In the case where another audio memory which is used alternatively is provided in addition to the RAM 28, the sound receiving operation can be carried out continuously.

When it is detected in Step S50 that the stop switch 10 has been operated during the sound receiving operation, the sound receiving operation is suspended, and the last video signal and the AV number N are recorded on the track $V_{Ni}$ (Steps S68 and S69). This track is to record the last video signal, and therefore the counting value of the counter 81 corresponding to the number of the video track where the next video signal is to be recorded is not recorded.

Thereafter, the head 64 is moved to the track as represented by the counting value of the counter 82 (Step S70). Then, the audio signal including the index signal stored in the RAM 28 is recorded on the track $A_{Nj}$ where the head 64 is currently positioned, and the video track number $V_s$ and the AV number N are recorded as the control code on the track $A_{Nj}$ (Step S71). Next, the AV number N is increased by one in the counter 83, and the counting values of the counters 81 and 82 are increased by one respectively (Steps S72 and S73). Next, the AV number N, the counting values of the counters 81 and 82 are stored, and it is determined whether or not the device is in the recording mode (Steps S74 and S75). In Step S75, when the device is in the recording mode, Step S44 is executed again. On the other hand, in Step S75, when the device is not in the recording mode any more, the recording operation is suspended.

Figure 9:
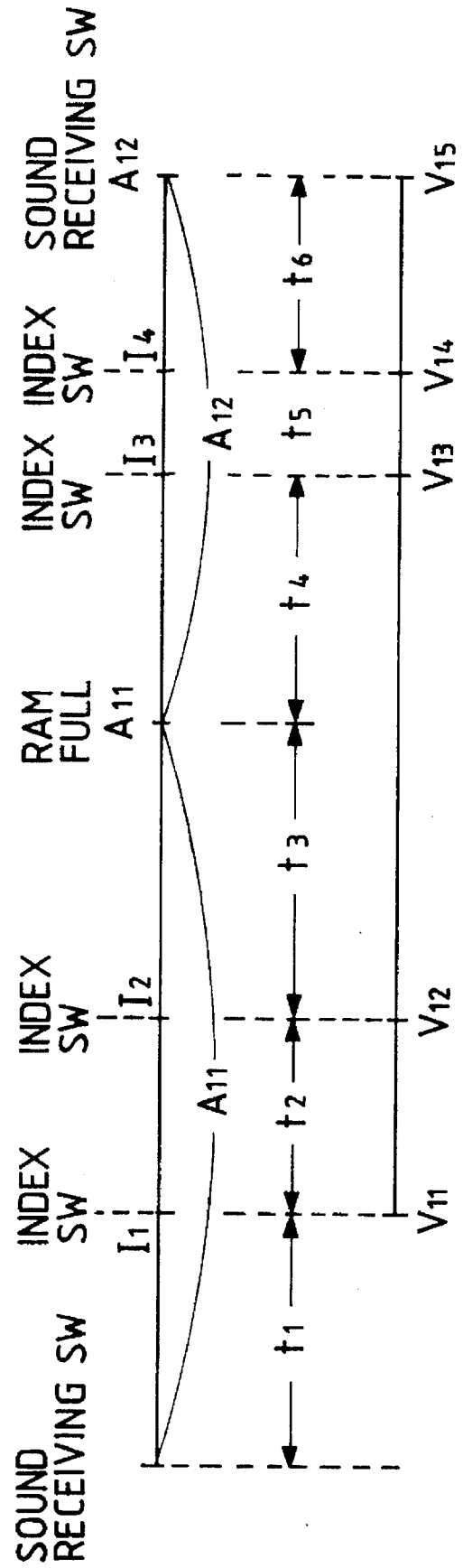
FIG. 9 is a timing chart for a description of the signal recording operation of the recording and reproducing system according to the invention.

FIG. 9 is a timing chart for the above-described operations. Further, FIG. 9 shows an example of the case where the AV number is one (N=1).

In this example, when a period of time $t_1$ passes from the time instant the sound receiving switch 16 is turned on to start the sound receiving operation, the index switch 14 is turned on; and when a period of time $t_2$ passes thereafter the index switch 14 is turned on again. And when a period of time $t_3$ passes thereafter, the RAM 28 becomes full. Furthermore, when a period of time t4 passes thereafter the index switch 14 is turned on, and when a period of time $t_5$, passes thereafter, the index switch 14 is turned on. Furthermore, when a period of time $t_6$ passes thereafter, the sound reception switch 16 is operated. As a result, the video signals $V_{11}$ through $V_{15}$ are recorded sequentially on the first through fifth tracks located successively radially inwardly with the timing of the operations of these switches, respectively. In this operation, the number of the second video track together with the AV number is recorded as a DPSK signal on the first video track; the number of third video track with the AV number is recorded as a DPSK signal on the second track; the number of the fourth video track together with the AV number is recorded as a DPSK signal on the third video track; and the number of the fifth video track together with the AV number is recorded as a DPSK signal on the fourth video track. Further, only the AV number is recorded as a DPSK signal on the fifth video track. The number of the next video track is not recorded on the fifth video track.

Furthermore, on the twenty-sixth track as the first audio track, the audio signal $A_{11}$ lasting for the reproducing time $(t_1+t_2+t_3)$ corresponding to those video signals is recorded through time-axis compression. The control code for the first audio track contains the number of the first video track, the number of the second audio track and the AV number. Similarly, on the second audio track located radially inwardly next to the first audio track, the audio signal $A_{12}$ lasting for the reproducing time $(t_4+t_5+t_6)$ is recorded through time-axis compression. The control code for the second audio track contains the number of the third video track and the AV number. The third video track corresponds to the last video track of the three video tracks corresponding to the first audio track, in the reproducing operation.

Figure 13:
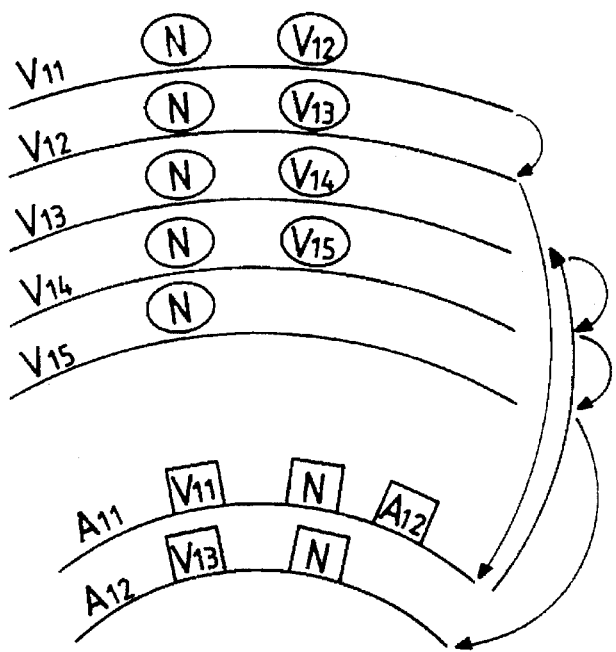
FIG. 13 is an explanatory diagram showing the movement of the head in the recording operation.

FIG. 13 is an explanatory diagram showing the movement of the head 64 in the recording operation. At first, the video signals are recorded on the tracks $V_{11}$ and $V_{12}$. Next, the audio signal is recorded on the track $A_{11}$. Thereafter, the video signals are recorded on the tracks $V_{13}$, $V_{14}$ and $V_{15}$ in sequence. Finally, the audio signal is recorded on the audio track $A_{12}$. The AV number N and the next video track number $V_F$ (except for the track $V_{15}$) are recorded as the ID codes on the respective video tracks. Further, the AV number N, the lead video track number $V_s$ and the next audio track number $A_F$ (except for the track $A_{12}$) are recorded in the control code on the respective audio tracks.

Figure 10:
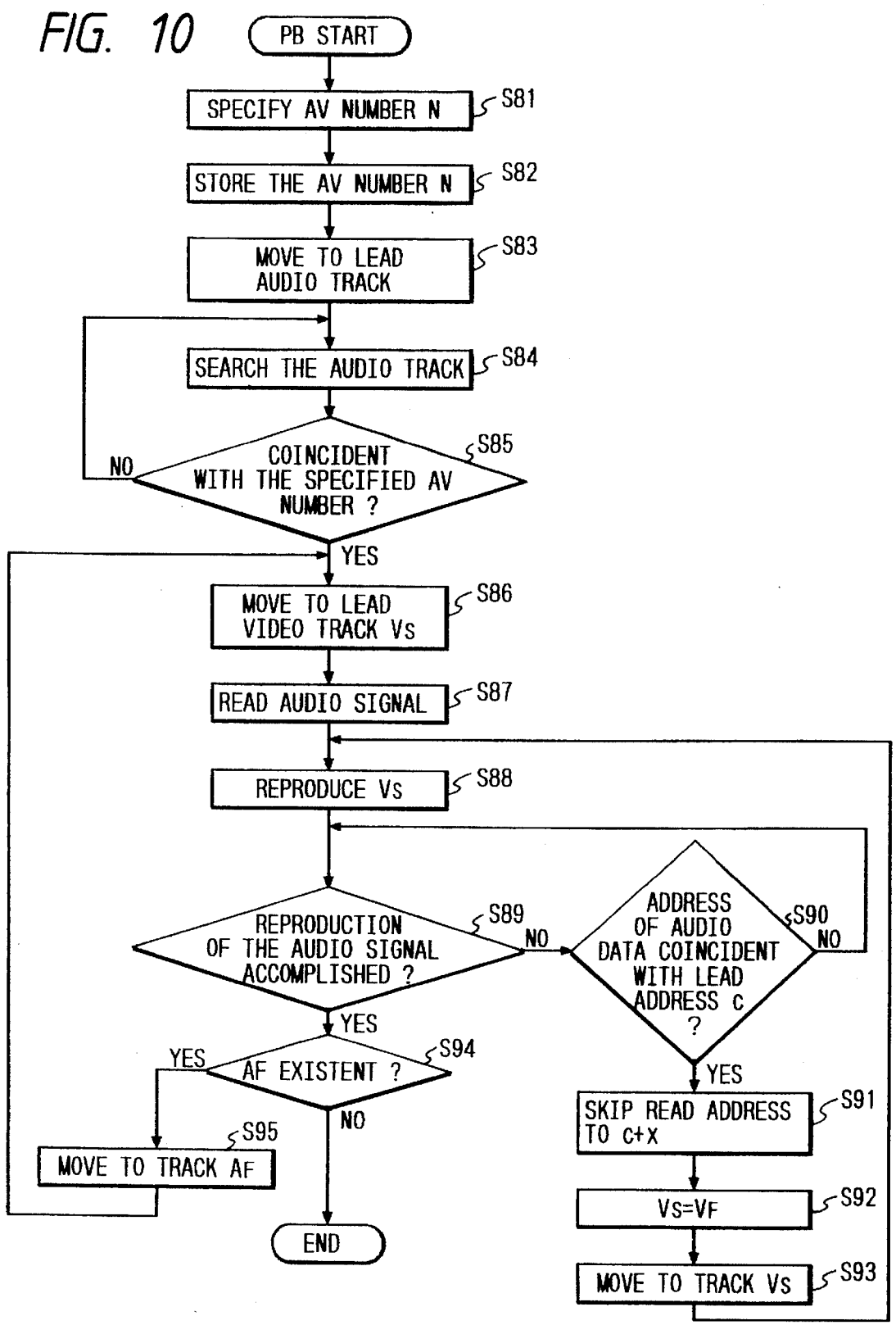
FIG. 10 is a flow chart for a description of the signal reproducing operation of the recording and reproducing system according to the invention.

The signal reproducing operation will now be described with reference to a flow chart of FIG. 10.

First, the operator operates the ten-key pad 11 to specify an AV number N, then the AV number N thus specified is stored in the RAM 80 (Steps S81 and S82). The AV number N is set to "1", unless otherwise specified. The AV number N thus specified is displayed on the display section 2.

Next, the head 64 is moved to the lead audio track (twenty-sixth track) (Step S83). Then, the audio track is searched to read the data recorded on the track (Step S84). The data thus read is stored in the RAM 28. Specifically, The reproducing signal from the audio track is FM-demodulated by the FM demodulator 75 and is then subjected to de-emphasis in the de-emphasis circuit 32. The output audio signal of the de-emphasis circuit 32 is applied through the switch 54 to the low-pass filter 30, where unwanted high frequency components are removed therefrom. The audio signal passed through the low-pass filter 30 is applied through the switches 55 and 53 to the A/D converter 26, where it is subjected to analog-to-digital conversion. The output audio signal of the A/D converter 26 is then applied through the RAM controller 27 to the RAM 28, where it is stored.

The RAM controller 27 detects the AV number N, the lead video track number $V_s$, and the next audio track number $A_F$ from the control code. Further, the RAM controller 27 detects a lead address c of the addresses where the index signal exists in the RAM 28. The index signal can be discriminated from the audio signal by detecting the same value existing cyclically (see FIG. 8). The RAM controller 27 can detect the index signal by monitoring the data stored in the RAM 28. Here, when a plurality of index signals are existent, all of lead addresses are detected. For example, when two index signals $I_1$ and $I_2$ are existent in one audio track (four sectors), lead addresses $c_1$ and $c_2$ are detected, as shown in FIG. 11.

Thereafter, when it is determined that the detected AV number N coincides with the specified AV number, the head 64 is moved to the lead video track $V_s$ (Steps S85 and S86). Consequently, the audio signal stored in the RAM 28 is read through time-axis expansion, and simultaneously the video signal on the track $V_s$ is reproduced (Steps S87 and S88).

That is, the FM video signal and the DPSK signal reproduced through the head 64 are demodulated by the FM demodulator 71 and the DPSK demodulator 72 respectively. The demodulated video signal is applied to the video signal processing circuit 42. The demodulated DPSK signal is applied to the CPU 43. The video signal is subjected to a predetermined process in the video signal processing circuit 42 to be applied to the CRT 44. The CPU 43 causes the display section 2 to display the number of the video track being reproduced.

The audio signal written in the RAM 28 is read out through time-axis expansion, and is applied through the RAM controller 27 to the D/A converter 29, where it is subjected to digital-to-analog conversion. The output of the D/A converter 29 is applied through the switch 52 to the noise reduction circuit 25. In the noise reduction circuit 25, the input audio signal is expanded for noise reduction. The audio signal thus processed is applied through the switch 51 to the low-pass filter 23, where unwanted high frequency components are removed from the audio signal. The audio signal thus processed is applied through the amplifier 24 to the loudspeaker 47.

In the case where the reproduction of the video signal is started in this way, when the index signal is detected before the reproduction of the audio signal from the RAM 28 is accomplished, that is, when an address of the audio data being currently digital-to-analog converted is coincident with the lead address c previously detected, the read address in the RAM 28 is skipped to c+x (Steps S89 through S91). Here, x represents the amount of the addresses at which the index signal occupies. In Step S91, skipping the read address in the RAM 28 to c+x prevents the index signal from being applied to the D/A converter 29. That is, the index signal is not output as the audio signal.

Thereafter, the track number $V_s$ is set to the next track number $V_F$ ($V_s=V_F$), the head 64 is moved to the track $V_s$, and Step S88 is effected again (Steps S92 and S93).

When the reproduction of the audio signal is accomplished and the next audio track $A_F$ is existent, the head 64 is moved to the track $A_F$ (Steps S89, S94 and S95). Step S86 is effected again after Step S95. Furthermore, in Step S94, when the next audio track $A_F$ is not existent, the reproducing operation is suspended.

Thus, the series of video signals and audio signals are reproduced successively from the tracks with the same timing as they were recorded.

A timing chart for this signal reproducing operation is as shown in FIG. 12. Further, FIG. 12 shows an example of the case where the AV number is one (N=1).

Upon start of the signal reproducing operation, the first video signal $V_{11}$ is first reproduced, and when the index signal $I_1$ is detected with the lapse of the period of time $t_1$, the next video signal $V_{12}$ is reproduced for the period of time $t_2$. When the next index signal $I_2$ is detected with the lapse of the period of time $t_2$, the video signal $V_{13}$ is reproduced. When the period of time $t_3$ has passed; that is, the audio signal $A_{11}$ recorded in the first audio track has been reproduced for the period of time $(t_1+t_2+t_3)$, the audio signal $A_{12}$ recorded on the next audio track is reproduced. And when the index signal $I_3$ is detected with the lapse of the period of time $t_4$, the video signal $V_{14}$ is reproduced. Furthermore, when the index signal $I_4$ is detected with the lapse of the period of time $t_5$, the last video signal $V_{15}$ is reproduced for the period of time $t_6$. The reproduction of the audio signal $A_{12}$ is continued for the period of time $(t_4+t_5+t_6)$.

Figure 14:
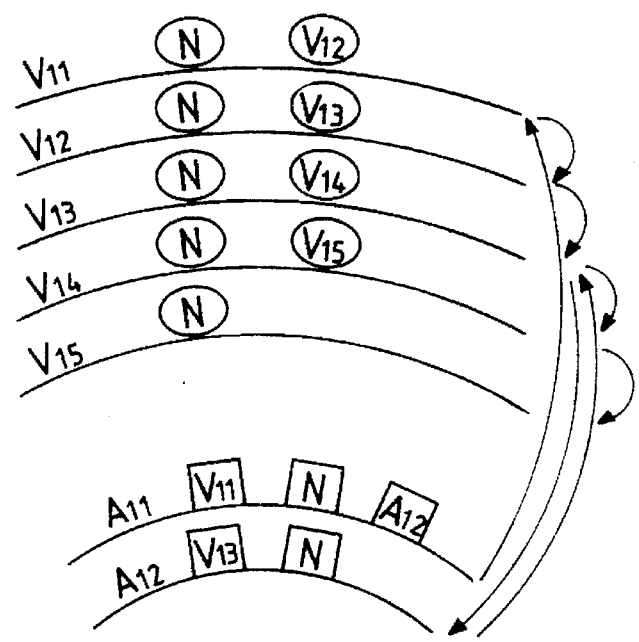
FIG. 14 is an explanatory diagram showing the movement of the head in the reproducing operation.

FIG. 14 is an explanatory diagram showing the movement of the head 64 in the reproducing operation. At first, the audio track $A_{11}$ is reproduced and the reproduced signal is stored in the RAM 28. Then, the lead video track number $V_{11}$ having the same AV number N (=1) is detected from the control code to reproduce the track $V_{11}$ and the data is read out of the RAM 28. Thereafter, in response to detection of the index signal, the tracks $V_{12}$ and $V_{13}$ are reproduced in sequence. When the reading operation from the RAM 28 is accomplished, the reproducing operation of the track $V_{13}$ is suspended, and the audio track $A_{12}$ is reproduced and the reproduced signal is stored in the RAM 28. Then, the lead video track number $V_{13}$ in the control code is detected and the reproducing operation of the track $V_{13}$ is started again. Thereafter, in response to detection of the index signal, the tracks $V_{14}$ and $V_{15}$ are reproduced in sequence.

In the above-described embodiment, on each video track (except for the last video track) the number of the next video track is recorded as a DPSK signal, and on each audio track the number of the first video track and the number of the next audio track (except for the last audio track) are recorded. However, the recording of these track numbers can be omitted in the case where the video tracks and the corresponding audio tracks are positioned according to a predetermined rule at all times as in the above-described embodiment.

In this case, a sequence is established so that each region is searched radially inwardly for the track having an AV number specified, with the video track and the audio track having the AV number being reproduced. In this embodiment, since a track to be reproduced primarily in the tracks having the same AV number is provided radially outward and the detecting operation of the AV number is carried out from outward tracks, all the tracks can be necessarily reproduced in a correct sequence.

In the above-described embodiment, the AV number is recorded on both the video track and the audio track; however, it may be recorded on only one of the tracks. For instance, in the above-described embodiment, in the control code of an audio track, the number of the corresponding first video track is recorded; and in each video track, the number of the following video track is recorded as a DPSK signal. Therefore, even in the case where the AV number is recorded only on the audio tracks, all the audio tracks having the AV number can be reproduced successively by making access to them radially inwardly. Furthermore, from the control code of the audio track, the corresponding first video track is searched for; and from the DPSK signal of the video track, the following video track is searched for. Thus, all the corresponding video tracks can be reproduced.

As was described above, in the disk recording device of the invention, the AV number is superposed on the video signals and/or audio signals. Therefore, by detecting the AV number, the recorded signals can be reproduced separately according to the AV number.

In the disk reproducing device of the invention, the video tracks and audio tracks having one and the same AV number are reproduced in combination. Therefore, by specifying an AV number instead of a track number, desired video signals and audio signals can be specified and reproduced irrespective of the number of tracks in which signals are recorded in correspondence thereto. Thus, the device exhibits a significant improvement in operability.

What is claimed is:

1. A recording and reproducing system operable in an AV mode in which audio and video signals are recorded in a plurality of sets, each set comprising a combination of at least one audio signal and a video signal associated with said at least one audio signal, said system comprising:

recording means for recording said plurality of sets of audio and video signals on tracks of a recording medium;

means for generating a discriminating information uniquely identifying each of said plurality of sets;

recording control means for controlling said recording means to record said discriminating information for a particular one of said plurality of sets on each track for audio and video signals in said particular set;

reproducing means for reproducing audio and video signals from said recording medium, said reproduced signals including at least the audio and video signals from a plurality of sets which include said discriminating information;

detecting means for detecting said discriminating information from said reproduced signals;

reproducing control means responsive to the detected discriminating information of said particular set for selecting said particular set and for controlling said reproducing means to reproduce in combination the audio and video signals in said particular set.

2. A recording and reproducing system as recited in claim 1, wherein said recording means records said discriminating information together with both of said video and audio signals in each set.

3. A recording and reproducing system as recited in claim 1, wherein said recording medium is a disk with a plurality of tracks, and said recording means records the audio and video signals on respective audio and video tracks of said disk.

4. A recording and reproducing system as recited in claim 3, wherein said plurality of tracks are displaced with respect to one another in a radial direction of said disk, wherein said recording means records at least one of audio signals and video signals together with said discriminating information on a sequence of tracks in said radial direction, and wherein said detecting means detects said discriminating information in the same sequence as that for said recording means.

5. A recording and reproducing system as recited in claim 3, wherein said recording means further records, on a current audio track, a current audio signal together with data for the number of a next audio track in which a next audio signal following the current audio signal is to be recorded.

6. A recording and reproducing system as recited in claim 3, wherein said recording means further records, on a current video track, a current video signal together with data for the number of a next video track in which a next video signal following the current video signal is to be recorded.

7. A recording and reproducing system as recited in claim 1, wherein said recording means includes means for generating and recording an index signal as part of said audio signal, and wherein said reproducing control means is responsive to said index signal for switching from a currently reproduced video signal to another video signal.

8. A recording and reproducing system as recited in claim 4, wherein said recording means respectively records the audio signals and the video signals in an audio track area and an video track area separated from each other on the disk.

9. A disk recording device including recording means for recording audio and video signals on respective audio and video tracks of a disk with a plurality of tracks, said device being operable in an AV mode in which audio and video signals are recorded in a plurality of sets with each set consisting of a combination of at least one audio signal and a video signal associated with said at least one audio signal, said device comprising:

means for generating a discriminating information uniquely identifying each of said plurality of sets;

memory means for storing said discriminating information; and control means for controlling said recording means to record said discriminating information on each of said video and audio tracks, said discriminating information identifying each set being included with all of said audio and video signals in said each set, and said discriminating information recorded with said audio and video signals being the same for all audio and video signals in a given set of said plurality of sets.

10. A disk recording device as recited in claim 9, wherein said device includes means for generating an index signal and an index switch for indicating an insertion of an index signal in the audio signal of a particular set for controlling reproduction of video signals in said particular set, and a means responsive to operation of said index switch during a sound receiving operation for inserting an index signal in the audio signals.

11. A disk recording device as recited in claim 9, wherein each video signal in a set is recorded together with a signal indicating the location of the next track.

12. A disk recording device as recited in claim 9, further comprising audio signal memory means for temporarily storing an audio signal generated during a sound receiving operation, means for detecting a full audio signal memory means, and means responsive to the detection of a full audio signal memory means for recording the stored audio signal on an audio track of said disk together with said discriminating information.

13. A disk recording device as recited in claim 9, wherein said plurality of tracks are displaced with respect to one another in a radial direction of said disk and wherein said recording means records at least one of audio signals and video signals together with said discriminating information on a sequence of tracks in said radial direction.

14. A disk recording device as recited in claim 9, wherein said discriminating information is recorded with both of said video and audio signals in each set.

15. A disk reproducing device including a user-operable selection means for specifying a discriminating information uniquely identifying a desired set of audio and video signals to be reproduced and a reproducing means for reproducing from a disk discriminating information previously recorded on said disk as well as audio and video signals from a plurality of sets of audio and video signals which have been recorded on said disk on respective audio and video tracks, each of said plurality of sets of signals comprising a combination of at least one audio signal and at least one video signal associated with said at least one audio signal, with all of said audio and video signals in each set of said plurality of sets of audio and video signals being recorded together with discriminating information included therein and uniquely identifying said each set of signals, and with the discriminating information recorded with said audio and video signals in each set being the same for all audio and video signals in a given set of said plurality of sets, said reproducing device being operable in an AV mode in which said desired set of audio and video signals are reproduced together, said device comprising:

detecting means for detecting, in the audio and video signals reproduced from said disk as said reproducing means reproduces audio and video signals belonging to said plurality of sets of audio and video signals, discriminating information which matches said discriminating information uniquely identifying said desired set of audio and video signals to be reproduced; and control means responsive to said detecting means for controlling said reproducing means to reproduce in combination the audio and video signals in said desired set of audio and video signals.

16. A disk reproducing device as recited in claim 15, wherein said disk includes tracks which are displaced radially with respect to one another, and wherein said detecting means detects said discriminating information from successive tracks in said radial direction.

17. A disk reproducing device as recited in claim 15, wherein said discriminating information is recorded with both of said audio and video signals in said set, and said control means controls said reproducing means to reproduce together the audio and video signals having the same discriminating information.

18. A disk reproducing device as recited in claim 15, wherein said detecting means detects said discriminating information from a predetermined sequence of tracks on said disk.

* * * * *